(12) United States Patent
Yang et al.

(10) Patent No.: US 11,661,492 B2
(45) Date of Patent: May 30, 2023

(54) WHITE POLYESTER FILM AND METHOD FOR MANUFACTURING THE SAME

(71) Applicant: NAN YA PLASTICS CORPORATION, Taipei (TW)

(72) Inventors: Wen-Cheng Yang, Taipei (TW);
Te-Chao Liao, Taipei (TW);
Chun-Cheng Yang, Taipei (TW);
Chia-Yen Hsiao, Taipei (TW);
Chih-Feng Wang, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 36 days.

(21) Appl. No.: 17/401,325

(22) Filed: Aug. 13, 2021

(65) Prior Publication Data
US 2022/0243030 A1   Aug. 4, 2022

(30) Foreign Application Priority Data

Jan. 29, 2021 (TW) ................ 110103363

(51) Int. Cl.
| | | |
|---|---|---|
| *B29C 48/08* | (2019.01) | |
| *C08J 11/10* | (2006.01) | |
| *B29C 48/00* | (2019.01) | |
| *C08J 5/18* | (2006.01) | |
| *C08J 11/06* | (2006.01) | |
| *C08L 67/02* | (2006.01) | |
| *B29K 67/00* | (2006.01) | |
| *B29K 105/00* | (2006.01) | |
| *B29K 105/26* | (2006.01) | |

(52) U.S. Cl.
CPC ............. *C08J 11/10* (2013.01); *B29C 48/022* (2019.02); *C08J 5/18* (2013.01); *C08J 11/06* (2013.01); *C08L 67/02* (2013.01); *B29C 48/08* (2019.02); *B29K 2067/003* (2013.01); *B29K 2105/0094* (2013.01); *B29K 2105/26* (2013.01); *C08J 2367/02* (2013.01); *C08L 2205/025* (2013.01); *C08L 2207/20* (2013.01)

(58) Field of Classification Search
CPC .... C08J 5/18; C08J 11/10; C08J 11/06; B29K 2067/003
USPC .......................................................... 521/48
See application file for complete search history.

(56) References Cited

U.S. PATENT DOCUMENTS

2019/0061400 A1   2/2019 Maeba et al.
2021/0047493 A1*  2/2021 Liao ................ B29B 17/0036

FOREIGN PATENT DOCUMENTS

| CN | 104327254 | 2/2015 |
|---|---|---|
| EP | 1418195 | 5/2004 |
| EP | 3778743 | 2/2021 |
| JP | 2009255375 | 11/2009 |
| JP | 2011256328 | 12/2011 |
| JP | 2014239126 | 12/2014 |

OTHER PUBLICATIONS

Caliendo Heather, "Researchers Combine Mechanical and Chemical Recycling", Plastics Technology, Nov. 18, 2020, pp. 1-4. Available at: https://www.ptonline.com/articles/researchers-combining-mechanical-and-chemical-recycling.
Maron Samuel H. et al., "A New Method for Determination of Intrinsic Viscosity", Journal of Polymer Science: Part A-2, vol. 7, Jan. 1, 1969, pp. 309-324.
C. J. Heffelfinger, "A Survey of Film Processing Illustrated with Poly(Ethylene Terephthalate)", Polymer Engineering and Science, vol. 18, No. 15, Nov. 1, 1978, pp. 1163-1173.
"Office Action of Taiwan Counterpart Application", dated Jul. 6, 2022, p. 1-p. 5.
"Search Report of Europe Counterpart Application", dated Jun. 24, 2022, p. 1-p. 10.
"Office Action of Japan Counterpart Application", dated Jan. 31, 2023, p. 1-p. 3.

* cited by examiner

*Primary Examiner* — Terressa Boykin
(74) *Attorney, Agent, or Firm* — JCIPRNET

(57) ABSTRACT

A white polyester film and a method for manufacturing the same are provided. The method for manufacturing the white polyester film includes: providing a recycled polyester material; physically regenerating a part of the recycled polyester material to form physically regenerated polyester chips having a first intrinsic viscosity; chemically regenerating another part of the recycled polyester material to form chemically regenerated polyester chips having a second intrinsic viscosity less than the first intrinsic viscosity; mixing white regenerated polyester chips, the physically regenerated polyester chips, and the chemically regenerated polyester chips according to a predetermined intrinsic viscosity so as to form a polyester masterbatch material; melting and extruding the polyester masterbatch material to obtain the white polyester film having the predetermined intrinsic viscosity.

5 Claims, 4 Drawing Sheets

WHITE POLYESTER FILM AND METHOD FOR MANUFACTURING THE SAME

CROSS-REFERENCE TO RELATED APPLICATION

This application claims the priority benefit of Taiwanese application no. 110103363, filed on Jan. 29, 2021. The entirety of the above-mentioned patent application is hereby incorporated by reference herein and made a part of this specification.

BACKGROUND

Technical Field

The disclosure relates to a white polyester film and a method for manufacturing the same, in particular to a white polyester film prepared by using both a physically regenerated polyester resin and a chemically regenerated polyester resin and a method for manufacturing the same.

Description of Related Art

In the prior art, the most common recycling method for waste PET bottles is the physical recycling method (or mechanical recycling method). In the physical recycling method, mainly waste PET bottle materials are pulverized by a physical mechanical means; then the pulverized PET bottle materials are placed in a high temperature environment for melting; then the molten PET bottle materials are pelletized to form physically regenerated polyester chips. The physically regenerated polyester chips may be used in subsequent processing operations.

The physically regenerated polyester chips produced by the physical recycling method usually have higher intrinsic viscosity (IV). To adjust the intrinsic viscosity of the physically regenerated polyester chips is adjusted mainly by adopting solid state polymerization. However, the solid state polymerization method may only be used to increase the intrinsic viscosity of the physically regenerated polyester chips, and may not be used to reduce the intrinsic viscosity of the physically regenerated polyester chips. In addition, the general film-making process usually has certain limitations on the intrinsic viscosity range of polyester chips. The physically regenerated polyester chips produced by the physical recycling method are generally only suitable for bottle blowing and spinning processes, and may not suitable for a film extrusion process.

To make the physically regenerated polyester chips suitable for the film-making process is mainly mixed the physically regenerated polyester chips and additional virgin polyester chips to reduce the overall intrinsic viscosity of the polyester materials. However, this method may be not able to effectively increase the proportion of the recycled polyester material in the white polyester film, and therefore the final white polyester film product cannot meet the demands of environmental protection. That is to say, in the existing white polyester film, the proportion of recycled polyester has a certain limit that needs to be overcome.

SUMMARY

The technical issue to be solved by the disclosure is to provide a white polyester film and a method for manufacturing the same to overcome the shortcomings of the technology.

In order to solve the above technical issue, one of the technical solutions adopted in the disclosure is to provide a white polyester film and a method for manufacturing the same. The method for manufacturing a white polyester film includes the following steps: providing a recycled polyester material; physically regenerating a part of the recycled polyester material to form physically regenerated polyester chips; wherein the physically regenerated polyester chips have a first intrinsic viscosity; chemically regenerating another part of the recycled polyester material to form chemically regenerated polyester chips; wherein the chemically regenerated polyester chips have a second intrinsic viscosity less than the first intrinsic viscosity; mixing white regenerated polyester chips, the physically regenerated polyester chips, and the chemically regenerated polyester chips according to a predetermined intrinsic viscosity so as to form a polyester masterbatch material; and melting and extruding the polyester masterbatch material to obtain the white polyester film having the predetermined intrinsic viscosity. The predetermined intrinsic viscosity of the white polyester film is 0.36 dL/g to 0.65 dL/g; an acid value of the white polyester film is 10 mgKOH/g to 80 mgKOH/g; a surface roughness (Ra) of the white polyester film is 1 nm to 500 nm; a dynamic friction coefficient of the white polyester film is 0.2 to 0.4.

In order to solve the above technical issue, one of the technical solutions adopted in the disclosure is to provide a white polyester film. The white polyester film is formed by mixing, melting, and extruding a physically regenerated polyester resin and a chemically regenerated polyester resin according to a predetermined intrinsic viscosity, and the white polyester film has the predetermined intrinsic viscosity; wherein the predetermined intrinsic viscosity of the white polyester film is 0.36 dL/g to 0.65 dL/g; an acid value of the white polyester film is 10 mgKOH/g to 80 mgKOH/g; a surface roughness (Ra) of the white polyester film is 1 nm to 500 nm; a dynamic friction coefficient of the white polyester film is 0.2 to 0.4.

In some embodiments, based on a total weight of 100 mol % of the white polyester film, a content of isophthalic acid in the white polyester film is between 0.1 mol % and 6 mol %; a storage modulus of the white polyester film at 150° C. and 10 Hz is $3.5 \times 10^9$ dyne/cm$^2$ to $6.0 \times 10^9$ dyne/cm$^2$.

In some embodiments, a haze of the white polyester film is greater than 80%, a light transmittance of the white polyester film is less than 10%, a reflectance of the white polyester film is 80% to 98%, and a shading value of the white polyester film is greater than or equal to 1.2.

In order to solve the above technical issue, another technical solution adopted in the disclosure is to provide a white polyester film. A predetermined intrinsic viscosity of the white polyester film is 0.36 dL/g to 0.65 dL/g; an acid value of the white polyester film is 10 mgKOH/g to 80 mgKOH/g; a surface roughness (Ra) of the white polyester film is 1 nm to 500 nm; a dynamic friction coefficient of the white polyester film is 0.2 to 0.4.

In some embodiments, based on a total weight of 100 mol % of the white polyester film, a content of isophthalic acid in the white polyester film is between 0.1 mol % and 6 mol %; a storage modulus of the white polyester film at 150° C. and 10 Hz is $3.5 \times 10^9$ dyne/cm$^2$ to $6.0 \times 10^9$ dyne/cm$^2$.

In some embodiments, a haze of the white polyester film is greater than 80%, a light transmittance of the white polyester film is less than 10%, a reflectance of the white polyester film is 80% to 98%; and a shading value of the white polyester film is greater than or equal to 1.2.

In some embodiments, based on a total weight of 100 wt % of the white polyester film, a content of biomass-derived ethylene glycol in the white polyester film is not more than 5 wt %.

One of the beneficial effects of the disclosure is that in the white polyester film and the method for manufacturing the same provided by the disclosure, via the technical solution of "mixing white regenerated polyester chips, the physically regenerated polyester chips, and the chemically regenerated polyester chips according to a predetermined intrinsic viscosity to form a polyester masterbatch material", the polyester masterbatch material may be adjusted to have a predetermined intrinsic viscosity so as to be suitable for a film extrusion process, and a higher proportion of the recycled polyester masterbatch material is achieved.

In order to further understand the features and technical content of the disclosure, please refer to the following detailed description and figures of the disclosure. However, the provided figures are only used for reference and description, and are not used to limit the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

The following are specific embodiments to illustrate the implementation of the "white polyester film and a method for manufacturing the same" disclosed in the disclosure. Those skilled in the art may understand the advantages and effects of the disclosure from the content disclosed in this specification. The disclosure may be implemented or applied via other different specific embodiments, and various details in this specification may also be modified and changed based on different viewpoints and applications without departing from the concept of the disclosure. In addition, pre-declaration, the figures of the disclosure are merely schematic illustrations, and are not drawn according to actual size. The following embodiments further describe the related technical content of the disclosure in detail, but the disclosed content is not intended to limit the scope of the disclosure. In addition, the term "or" used in this specification may include any one or a combination of a plurality of the associated listed items depending on the actual situation.

[Method for Manufacturing White Polyester Film]

One of the objects of the disclosure is to increase the proportion of the recycled polyester material used in the white polyester film, so that the white polyester film product may meet the demands of environmental protection.

Figure 1:
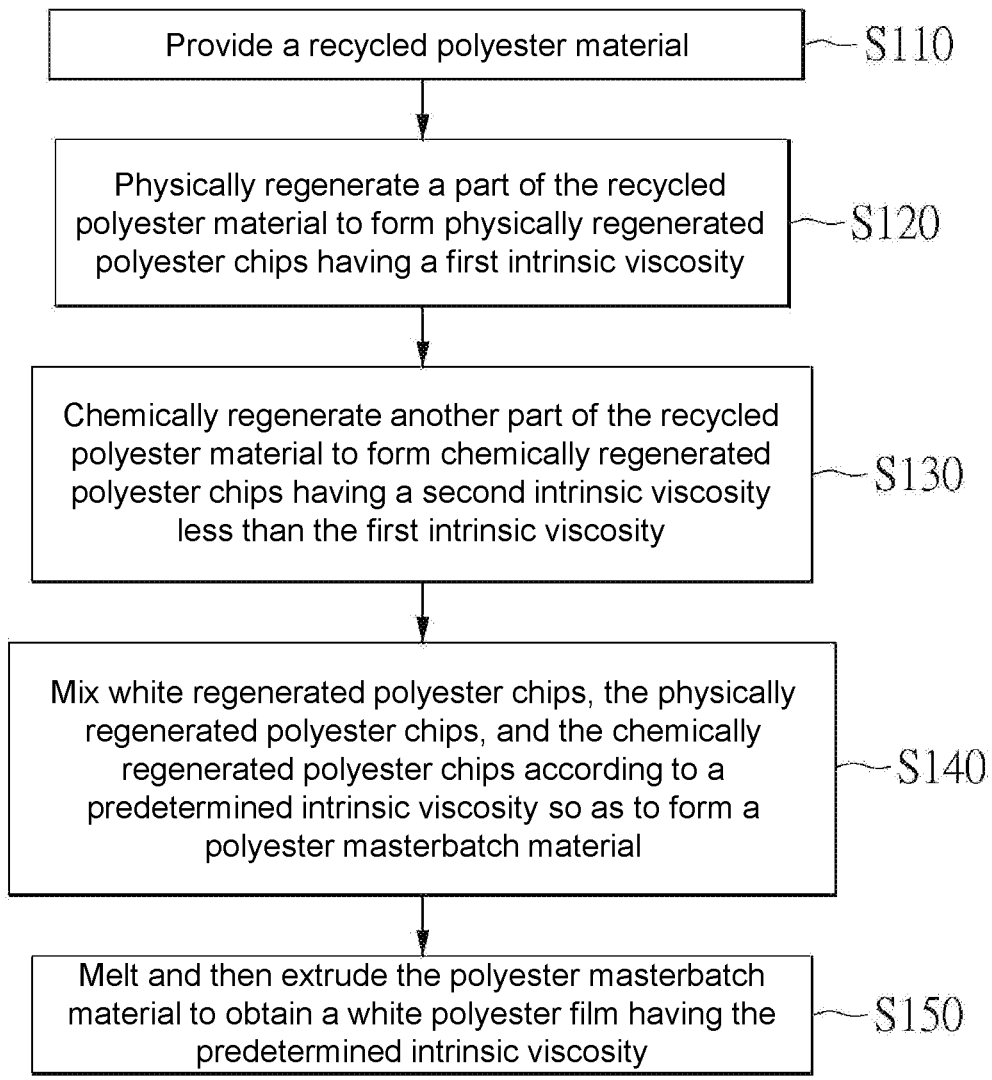
FIG. 1 is a schematic flowchart of the method for manufacturing a white polyester film of the disclosure.

In order to achieve the above object, please refer to FIG. 1. According to an embodiment of the disclosure, a method for manufacturing a white polyester film is provided to effectively increase the proportion of the recycled polyester material in the white polyester film, and to provide the resulting white polyester film with good processability. The method for manufacturing the white polyester film includes step S110 to step S150. It must be noted that the sequence of the steps and the actual operation method described in the present embodiment may be adjusted according to requirements, and are not limited to those described in the present embodiment.

Step S110 includes: providing a recycled polyester material.

In order to obtain a reusable recycled polyester material, the recycling method of polyester materials includes: collecting various types of waste polyester materials; classifying according to the types, colors, and uses of the waste polyester materials. Then, the waste polyester materials are compressed and packaged. Then, the packaged waste polyester materials are transported to a waste treatment plant. In the present embodiment, the waste polyester materials are recycled PET bottles (r-PET), but the disclosure is not limited thereto.

The recycling method of the polyester materials further includes: removing other objects (such as bottle caps, labels, and adhesives) on the waste polyester materials. Then, the waste polyester materials are pulverized by a physical mechanical means. Then, the bottle mouth, liner, and bottle body of different materials are separated by flotation. Then, the pulverized waste polyester materials are dried to obtain a processed recycled polyester material, such as r-PET flakes, to facilitate the subsequent thin film manufacturing process.

It is worth mentioning that, in other modified embodiments of the disclosure, the recycled polyester material may also be, for example, a directly purchased processed recycled polyester material.

It should be mentioned that, the terms "polyester", "polyester material", etc. herein refer to any type of polyester, especially aromatic polyester, and here in particular refers to the polyester derived from the copolymerization of terephthalic acid and ethylene glycol, namely polyethylene terephthalate (PET).

Moreover, the polyester may also be, for example, polytrimethylene terephthalate (PTT), polybutylene terephthalate (PBT), or polyethylene naphthalate (PEN). In the present embodiment, the polyester is preferably polyethylene terephthalate and polytrimethylene terephthalate. Moreover, copolymers may also be used, particularly copolymers obtainable by using two or more dicarboxylic acids and/or two or more diol components.

In an embodiment of the disclosure, the r-PET flakes contain isophthalic acid (IPA) as a diacid unit. Therefore, the final white polyester film also contains isophthalic acid. In particular, based on a total weight of 100 mol % of the white polyester film, the content of isophthalic acid in the white polyester film is between 0.1 mol % and 6 mol %. Preferably, the content of isophthalic acid in the white polyester film is between 0.5 mol % and 5 mol %.

In an embodiment of the disclosure, the r-PET flakes contain biomass-derived ethylene glycol as a diol unit. Therefore, the final white polyester film also contains biomass-derived ethylene glycol. In particular, based on a total weight of 100 wt % of the white polyester film, the content of biomass-derived ethylene glycol in the white polyester film is not more than 5 wt %. Moreover, based on all the carbon in the white polyester film, the content of carbon derived from biomass measured by radioactive elements ($C^{14}$) is not more than 5%.

In an embodiment of the disclosure, the r-PET flakes contain a metal catalyst, so that the final white polyester film also contains the metal catalyst. In particular, the metal catalyst is at least one selected from the group consisting of antimony (Sb), germanium (Ge), and titanium (Ti). Based on a total weight of 100 wt % of the white polyester film, the content of the metal catalyst in the white polyester film is 0.0003 wt % to 0.04 wt %.

Step S120 includes: physically regenerating a part of the recycled polyester material to obtain physically regenerated polyester chips. The physically regenerated polyester chips have a first intrinsic viscosity. In the present embodiment, the first intrinsic viscosity of the physically regenerated polyester chips is generally not less than 0.60 dL/g. Preferably, the first intrinsic viscosity is 0.65 dL/g to 0.90 dL/g. More preferably, the first intrinsic viscosity is 0.65 dL/g to 0.80 dL/g.

Specifically, the manufacturing steps of the physically regenerated polyester chips include: pulverizing a part of the recycled polyester material (such as r-PET flakes) by a physical mechanical means to reduce the time and energy consumption required to melt the recycled polyester material. Then, the pulverized recycled polyester material is melted by a single screw extruder or a twin screw extruder, so that the recycled polyester material is in a molten state. Then, a first screen is used to filter the recycled polyester material in the molten state to remove solid impurities in the recycled polyester material. Lastly, pelletizing is performed to form the physically regenerated polyester chips.

In other words, the recycled polyester material is reshaped by cutting, melting, filtering, extruding, and the like in sequence in order to rearrange the polyester molecules in the original recycled polyester material, so as to prepare a plurality of the physically regenerated polyester chips.

It should be mentioned that since in the physical regenerating process, the polyester molecules of the recycled polyester material are only rearranged but not reorganized, the components (such as metal catalysts, slipping agents, or copolymerized monomers, etc.) originally present in the recycled polyester material are still present in the physically regenerated polyester chips, so that the final white polyester film also contains these components. Furthermore, the various characteristics of the recycled polyester material itself are also retained in the physically regenerated polyester chips.

Since the molecular weight of the recycled polyester material in the physical regenerating process is not changed significantly, the recycled polyester material has a relatively high viscosity in a molten state and has worse flow properties. Accordingly, if a screen with an insufficient mesh diameter is used, the issue of poor filter efficiency readily occurs.

In order to achieve a better filtering effect, in the present embodiment, the mesh diameter of the first screen is preferably between 50 microns and 100 microns. In other words, the first screen may screen out solid impurities with a particle size larger than the mesh diameter, but the disclosure is not limited thereto.

It is worth noting that there are different suitable intrinsic viscosity ranges for different film-making processes. In general, the physically regenerated polyester chips (physically regenerated polyester resin) obtained by physical regeneration have a higher intrinsic viscosity (not less than 0.60 dL/g). If only the physically regenerated polyester chips (physically regenerated polyester resin) are used, the polyester masterbatch material may be only suitable for bottle blowing and spinning processes, not for a film extrusion process.

To adjust the intrinsic viscosity of the physically regenerated polyester chips may mainly adopt solid state polymerization. However, the solid state polymerization method may only be used to increase the intrinsic viscosity of the physically regenerated polyester chips, and may not be used to reduce the intrinsic viscosity of the physically regenerated polyester chips.

In order to solve the above issue, in the disclosure, chemically regenerated polyester chips (chemically regenerated polyester resin) are prepared by a chemical regenerating step in step S130 with a lower intrinsic viscosity (not greater than 0.65 dL/g). As a result, by using both the physically regenerated polyester chips and the chemically regenerated polyester chips at the same time, and adjusting the proportion of the physically and chemically regenerated polyester chips, the effect of adjusting the intrinsic viscosity of the polyester masterbatch material may be achieved, so that the polyester masterbatch material may be suitable for a film extrusion process.

Step S130 includes: chemically regenerating another part of the recycled polyester to obtain the chemically regenerated polyester chips. The chemically regenerated polyester chips have a second intrinsic viscosity, and the second intrinsic viscosity of the chemically regenerated polyester chips is less than the first intrinsic viscosity of the physically regenerated polyester chips. In the present embodiment, the second intrinsic viscosity of the chemically regenerated polyester chips is generally not more than 0.65 dL/g. Preferably, the second intrinsic viscosity is 0.40 dL/g to 0.65 dL/g. More preferably, the second intrinsic viscosity is 0.50 dL/g to 0.65 dL/g.

Specifically, the manufacturing steps of the chemically regenerated polyester chips include: cutting or pulverizing another part of the recycled polyester material (such as r-PET flakes) to reduce the time and energy consumption required to depolymerize the recycled polyester material. Then, the cut or pulverized regenerated polyester material is put into a chemical depolymerization solution to depolymerize the regenerated polyester material so as to form a masterbatch material mixture. Next, a second screen is used to filter the masterbatch material mixture to remove solid impurities in the recycled polyester material, thereby reducing the concentration of non-polyester impurities in the masterbatch material mixture.

Next, the masterbatch material mixture filtered by the second screen is subjected to an esterification reaction, and an inorganic additive or a copolymer monomer is added during the esterification reaction. Lastly, under specific reaction conditions, the monomers and/or oligomers in the masterbatch material mixture are repolymerized and pelletized to obtain the chemically regenerated polyester chips. In particular, the liquid temperature of the chemical depolymerization solution may be, for example, 160° C. to 250° C., but the disclosure is not limited thereto. Furthermore, the mesh diameter of the second screen is less than the mesh diameter of the first screen.

It should be mentioned that, the chemical depolymerization solution may cause chain scission to the polyester molecules in the recycled polyester material, so as to achieve the effect of depolymerization, and a polyester composition with shorter molecular chain and an ester monomer composed of one diacid unit and two diol units may be further obtained, such as: bis(2-hydroxyethyl) terephthalate (BHET). That is, the molecular weight of the masterbatch material mixture is less than the molecular weight of the recycled polyester material.

In the present embodiment, the chemical depolymerization solution may be, for example, a solution of water, methanol, ethanol, ethylene glycol, diethylene glycol, or a combination thereof, but the disclosure is not limited thereto. For example, water is used for hydrolysis, and methanol, ethanol, ethylene glycol, or diethylene glycol is used for alcoholysis.

Moreover, it should be mentioned that, different from the physical regenerating step, the chemical regenerating step involves "depolymerization and repolymerization of polyester molecules in the recycled polyester material" to depolymerize the polyester molecules into molecules with smaller molecular weight and further repolymerize the molecules into a new polyester resin.

In other embodiments of the disclosure, the method for preparing the chemically regenerated polyester chips is not limited to the above embodiments, and the chemically regenerated polyester chips may also be prepared by hydrolysis or supercritical fluid methods. The hydrolysis method is performed with the recycled polyester material in an alkaline solution, wherein by adjusting a certain temperature and pressure, and under the irradiation of microwave radiation, the polyester molecules are completely decomposed into monomers. The supercritical fluid method is to make the recycled polyester material decompose into a small amount of monomers and oligomers in supercritical fluid methanol. In particular, the yield of monomers and oligomers is affected by reaction temperature and reaction time.

Furthermore, due to the chemical recycling method, the recycled polyester material may be depolymerized into monomers with small molecular weight. Therefore, the impurities (such as colloidal impurities or other non-polyester impurities) originally present in the recycled polyester material (such as r-PET flakes) may be more readily excluded by filtering compared to physical recycling methods.

Moreover, because the chemical regenerating operation may reduce the molecular weight of the recycled polyester material (such as forming polyester compositions and compound monomers with shorter molecular chains), the recycled polyester material has a lower viscosity after being depolymerized, and the flow properties thereof are better. Accordingly, the chemical regenerating operation may use a screen with a smaller mesh diameter to eliminate impurities with a smaller particle size in the polyester material.

In order to achieve a better filtering effect, in the present embodiment, the mesh diameter of the second screen is preferably between 10 microns and 50 microns. In other words, the second screen may screen out solid impurities with a particle size larger than the mesh diameter, but the disclosure is not limited thereto.

In terms of filtering solid impurities, the physical regenerating step may only filter and recycle solid impurities with a larger particle size in the polyester material, and the chemical regenerating step may filter and recycle solid impurities with a smaller particle size in the polyester material. Therefore, the production quality of the white polyester film may be effectively improved.

Furthermore, the chemically regenerated polyester chips produced by the chemical regenerating step generally have a lower intrinsic viscosity. Moreover, the intrinsic viscosity of the chemically regenerated polyester chips is easier to control, and the intrinsic viscosity of the chemically regenerated polyester chips may be adjusted to be less than the intrinsic viscosity of the physically and chemically regenerated polyester chips.

Step S140 includes: mixing white regenerated polyester chips, the physically regenerated polyester chips, and the chemically regenerated polyester chips according to a predetermined intrinsic viscosity so as to form a polyester masterbatch material.

The intrinsic viscosity of the polyester masterbatch material is suitable for a film-making process. Specifically, the intrinsic viscosity of the polyester masterbatch material is 0.48 dL/g to 0.8 dL/g; preferably, the intrinsic viscosity of the polyester masterbatch material is 0.50 dL/g to 0.60 dL/g. The predetermined intrinsic viscosity is 0.36 dL/g to 0.65 dL/g; preferably, the predetermined intrinsic viscosity is 0.40 dL/g to 0.60 dL/g.

More specifically, the white regenerated polyester chips, the physically regenerated polyester chips, and the chemically regenerated polyester chips are mixed with each other in a predetermined weight ratio according to the predetermined intrinsic viscosity. Therefore, the mixed white regenerated polyester chips, physically regenerated polyester chips, and chemically regenerated polyester chips may have the predetermined intrinsic viscosity, which is suitable for the manufacture of the white polyester film.

The white regenerated polyester chips contain a white additive, and the white additive is selected from the group consisting of calcium carbonate particles, barium sulfate particles, and titanium dioxide particles. The particle size of the white additive is between 0.1 μm and 20 μm.

In the present embodiment, whether various white additives are added to the white regenerated polyester chips may be determined according to the object of the white polyester film. In a preferred embodiment, there is a single type of white additive in the white regenerated polyester chips.

For example, when calcium carbonate particles or barium sulfate particles are used as the white additive, the white polyester film may have a good reflection effect (reflection rate of 80% to 98%) and low specific gravity, and may usually be used in posters or express labels. However, because the surface of the white polyester film has microholes, the white polyester film is less suitable for long-term outdoor exposure.

For example, when titanium dioxide particles are used as the white additive, the white polyester film may have a lower color difference value (ΔE) and stronger physical properties, and is therefore more suitable for outdoor use. Further, the titanium dioxide may be anatase titanium dioxide or rutile titanium dioxide. When the white polyester film does not need to be exposed to the outdoors for a long time, anatase titanium dioxide or rutile titanium dioxide may be used; when the white polyester film may be exposed to the outdoors for a long time, rutile titanium dioxide may be used.

The white regenerated polyester chips may be prepared by a physical regenerating step or a chemical regenerating step. In other words, the white regenerated polyester chips include at least one of the physically white regenerated polyester chips and the chemically white regenerated polyester chips. The intrinsic viscosity of the white regenerated polyester chips is 0.35 dL/g to 0.70 dL/g, and preferably, the intrinsic viscosity of the white regenerated polyester chips is 0.4 dL/g to 0.65 dL/g.

Specifically, the method for manufacturing the physically white regenerated polyester chips includes melting a part of the recycled polyester material to obtain a first molten mixture. A white additive is added to the first molten mixture to form a second molten mixture. The second molten mixture is reshaped to obtain the physically white regenerated polyester chips. Based on a total weight of 100 weight percent of the physically white regenerated polyester chips, the physically white regenerated polyester chips include 5 weight percent to 60 weight percent of the white additive.

For example, when the white additive is calcium carbonate particles or barium sulfate particles, based on a total weight of 100 weight percent of the physically white regenerated polyester chips, the physically white regenerated polyester chips include 20 weight percent to 35 weight percent of the white additive. When the white additive is titanium dioxide particles, based on a total weight of 100 weight percent of the physically white regenerated polyester chips, the physically white regenerated polyester chips include 5 weight percent to 15 weight percent of the white additive.

Specifically, the method for manufacturing the chemically white regenerated polyester chips includes: depolymerizing another part of the recycled polyester material to obtain a first oligomer mixture. A white additive is added to the first oligomer mixture to form a second oligomer mixture. The second oligomer mixture is repolymerized to obtain the chemically white regenerated polyester chips. Based on a total weight of 100 weight percent of the chemically white regenerated polyester chips, the chemically white regenerated polyester chips include 20 weight percent to 40 weight percent of the white additive.

For example, when the white additive is calcium carbonate particles or barium sulfate particles, based on a total weight of 100 weight percent of the chemically white regenerated polyester chips, the chemically white regenerated polyester chips include 20 weight percent to 35 weight percent of the white additive.

In order to increase the proportion of the recycled polyester material, the various regenerated polyester chips all have a suitable usage range.

In terms of the predetermined weight ratio, based on an amount of 100 parts by weight of the polyester masterbatch material (that is, all polyester chips), the amount of the physically regenerated polyester chips is preferably 50 parts by weight to 95 parts by weight, more preferably 60 parts by weight to 80 parts by weight. The amount of the chemically regenerated polyester chips is between 5 parts by weight and 50 parts by weight, preferably between 20 parts by weight and 40 parts by weight, but the disclosure is not limited thereto.

In a preferred embodiment, the amount of the physically regenerated polyester chips is higher than the amount of the chemically regenerated polyester chips, but the disclosure is not limited thereto.

Step S150 includes: melting and extruding the polyester masterbatch material to form a white polyester film. In particular, the white polyester film has a predetermined intrinsic viscosity.

In the white polyester film, the physically regenerated polyester chips (including the physically white regenerated polyester chips) form a physically regenerated polyester resin, and the chemically regenerated polyester chips (including the chemically white regenerated polyester chips) form a chemically regenerated polyester resin. In addition, the white additive in the white regenerated polyester chips is evenly dispersed in the physically regenerated polyester resin and the chemically regenerated polyester resin.

According to the mixing ratio in step S140, based on a total weight of 100 wt % of the white polyester film, the content of the physically regenerated polyester resin is preferably 50 wt % to 95 wt %, and more preferably 60 wt % to 80 wt %. The content of the chemically regenerated polyester resin is preferably 5 wt % to 50 wt %, more preferably 20 wt % to 40 wt %. The content of the white additive is 0.1 wt % to 40 wt %.

Moreover, the total content of the physically regenerated polyester resin and the chemically regenerated polyester resin is 55 wt % to 100 wt %, and the total content is more preferably 70 wt % to 100 wt %.

According to the above configuration, the method for manufacturing the white polyester film of the present embodiment may include using a high proportion of the recycled polyester material without the addition of a virgin polyester resin, or only a small amount of the virgin polyester resin needs to be added. For example, in an embodiment of the disclosure, the amount of the virgin polyester resin is usually not more than 50 parts by weight, preferably, the virgin polyester resin is not more than 30 parts by weight, and more preferably, the virgin polyester resin is not more than 10 parts by weight.

In an embodiment of the disclosure, the physically regenerated polyester chips have a first acid value, the chemically regenerated polyester chips have a second acid value, and the second acid value is greater than the first acid value. In particular, the first acid value is between 10 mgKOH/g and 40 mgKOH/g, and the second acid value is between 20 mgKOH/g and 70 mgKOH/g.

Figure 2:
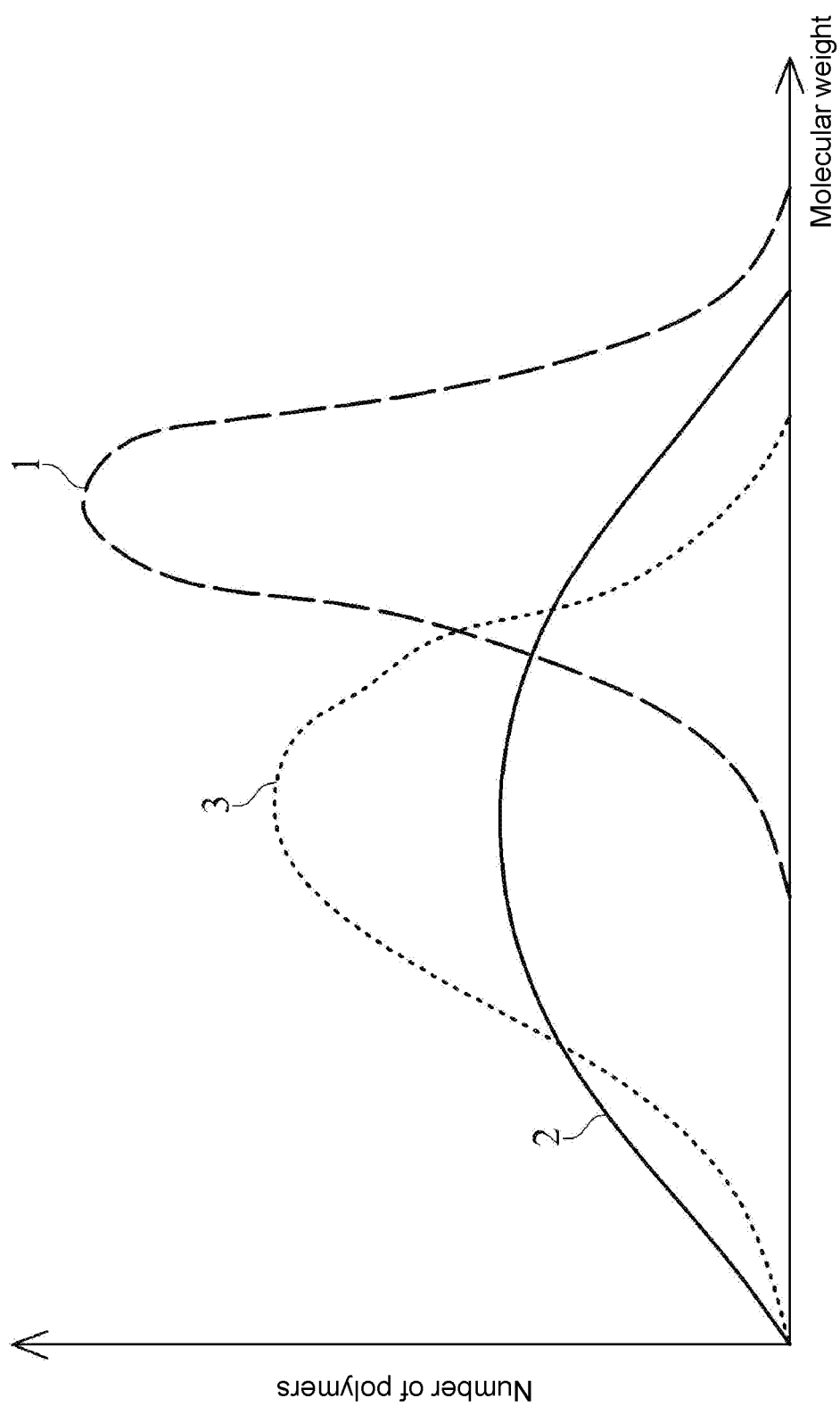
FIG. 2 is a schematic diagram of the molecular weight distribution of the polyester masterbatch material of the disclosure.

More specifically, referring to FIG. 2, the physically regenerated polyester chips have a first molecular weight distribution 1, the chemically regenerated polyester chips have a second molecular weight distribution 2, and the distribution range of the second molecular weight distribution 2 is wider than the distribution range of the first molecular weight distribution 1.

Moreover, by mixing the physically regenerated polyester chips and the chemically regenerated polyester chips, the polyester masterbatch material (white regenerated polyester chips, physically regenerated polyester chips, and chemically regenerated polyester chips) have a third molecular weight distribution 3, and the distribution range of the third molecular weight distribution 3 is between the first molecular weight distribution 1 and the second molecular weight distribution 2.

More specifically, in terms of molecular weight distribution, the molecular weight distribution of the chemically regenerated polyester chips is wider, thus contributing to the productivity of the film-making process, but the physical properties of a white polyester film produced only using the chemically regenerated polyester chips are worse (such as: mechanical properties). Furthermore, the production cost of the chemically regenerated polyester chips is higher.

The molecular weight distribution of the physically regenerated polyester chips is narrower, which is not good for the productivity of the film-making process, but a white polyester film with stronger mechanical properties may be produced, with better physical properties. In other words, it is not ideal to completely use the physically regenerated polyester chips or the chemically regenerated polyester chips.

The characteristic of the method for manufacturing the white polyester film of an embodiment of the disclosure is that the use of the physically regenerated polyester chips and the chemically regenerated polyester chips at the same time may improve the productivity of the film-making process, improve the physical properties of the white polyester film, and reduce the production cost of the white polyester film.

In addition, the method for manufacturing the white polyester film further includes adding inorganic particles to the recycled polyester material in the physical regenerating or chemical regenerating step, so that the final white polyester film contains the inorganic particles.

In the present embodiment, the inorganic particles are a slipping agent, but the disclosure is not limited thereto. In particular, the slipping agent is at least one selected from the group consisting of silica particles, calcium carbonate particles, barium sulfate particles, polystyrene particles, silicone particles, and acrylic particles. Moreover, based on a total weight of 100 wt % of the white polyester film, the content of the slipping agent is between 0.1 wt % and 10 wt %.

[White Polyester Film]

The above is the method for manufacturing a white polyester film of an embodiment of the disclosure, and the following describes the white polyester film of an embodiment of the disclosure. In the present embodiment, the white polyester film is formed by the above manufacturing method, but the disclosure is not limited thereto.

The material of the white polyester film includes a physically regenerated polyester resin, a chemically regenerated polyester resin, and a white additive. The physically regenerated polyester resin is formed from physically regenerated polyester chips, and the physically regenerated polyester chips have a first intrinsic viscosity. The chemically regenerated polyester resin is formed from chemically regenerated polyester chips, the chemically regenerated polyester chips have a second intrinsic viscosity, and the second intrinsic viscosity is less than the first intrinsic viscosity. The white additive is dispersed between the chemically regenerated polyester resin and the physically regenerated polyester resin.

It is worth noting that the physically regenerated polyester chips and the chemically regenerated polyester chips are mixed according to a predetermined intrinsic viscosity as the target, so that the resulting white polyester film may have the predetermined intrinsic viscosity.

In an embodiment of the disclosure, the first intrinsic viscosity of the physically regenerated polyester chips is not less than 0.60 dL/g, the second intrinsic viscosity of the chemically regenerated polyester chips is not more than 0.65 dL/g, and the predetermined intrinsic viscosity is 0.36 dL/g to 0.65 dL/g.

In a preferred embodiment of the disclosure, the first intrinsic viscosity of the physically regenerated polyester chips is 0.65 dL/g to 0.80 dL/g, the second intrinsic viscosity of the chemically regenerated polyester chips is 0.50 dL/g to 0.65 dL/g, and the predetermined intrinsic viscosity is 0.60 dL/g to 0.65 dL/g.

Moreover, the acid value of the white polyester film of the disclosure ranges from 10 mgKOH/g to 100 mgKOH/g. More preferably, the acid value of the white polyester film of the disclosure ranges from 10 mgKOH/g to 80 mgKOH/g. More preferably, the acid value of the white polyester film of the disclosure ranges from 40 mgKOH/g to 70 mgKOH/g. The acid value of the white polyester film is measured according to the standard measurement method D7409-15 set by the American Society for Testing and Materials (ASTM). When the acid value of the white polyester film is between 10 mgKOH/g and 100 mgKOH/g, the white polyester film has the functions of heat resistance and hydrolysis resistance.

The surface roughness (Ra) of the white polyester film of the disclosure is 1 nm to 500 nm. Preferably, the surface roughness of the white polyester film is 10 nm to 450 nm. More preferably, the surface roughness of the white polyester film is 20 nm to 430 nm. The surface roughness of white polyester film is measured according to DIN EN ISO4287/4288.

The dynamic friction coefficient of the white polyester film of the disclosure is 0.2 to 0.4. The dynamic friction coefficient of white polyester film is measured according to ASTM D1894.

When the surface roughness of the white polyester film is 1 nm to 500 nm and the dynamic friction coefficient of the white polyester film is 0.2 to 0.4, the manufacture, film collection, and back-end processing procedures of the white polyester film may be facilitated.

Figure 3:
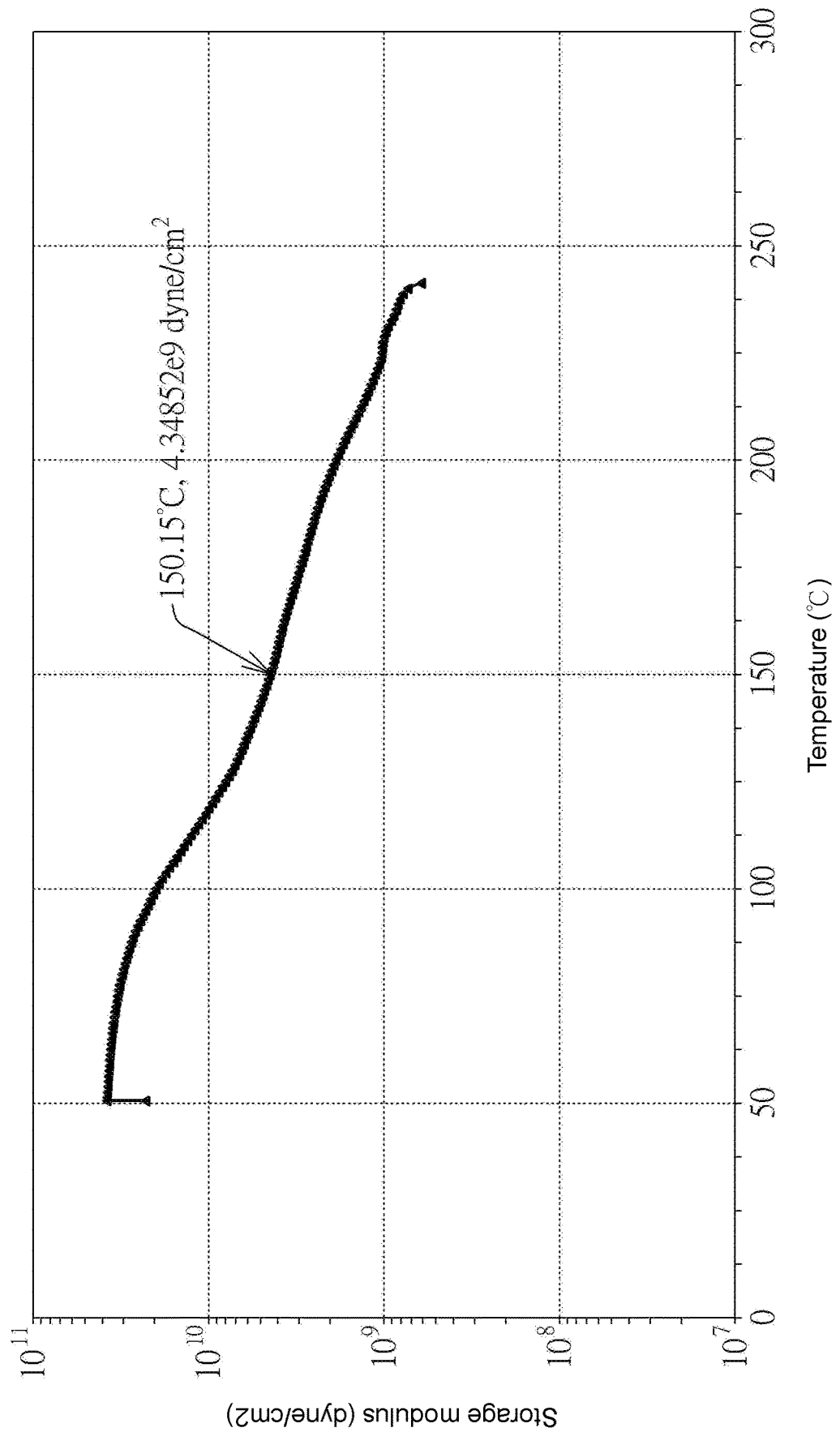
FIG. 3 is a test result of the storage modulus of the white polyester film in an embodiment of the disclosure.
Figure 4:
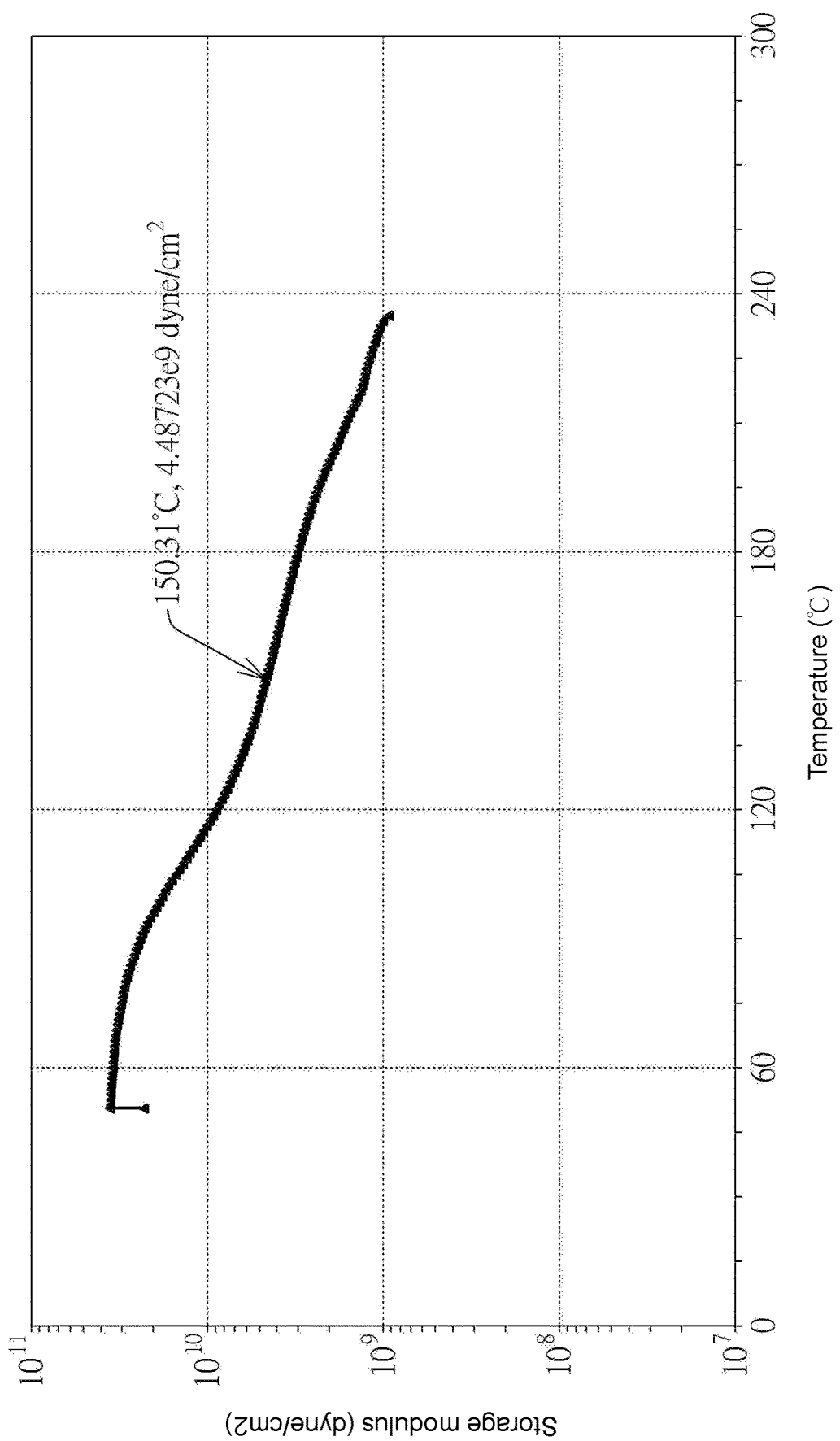
FIG. 4 is a test result of the storage modulus of the white polyester film in another embodiment of the disclosure.

The storage modulus of the white polyester film of the disclosure at 150° C. and 10 Hz is $3.5 \times 10^9$ dyne/cm$^2$ to $6.0 \times 10^9$ dyne/cm$^2$. Preferably, the storage modulus of the white polyester film of the disclosure at 150° C. and 10 Hz is $4.0 \times 10^9$ dyne/cm$^2$ to $5.0 \times 10^9$ dyne/cm$^2$. The storage modulus of the white polyester film is the average value of the storage modulus of the white polyester film in the longitudinal direction and the width measured by a dynamic viscoelasticity measuring apparatus. Please refer to FIG. 3 and FIG. 4 for the specific measurement results.

It is also worth mentioning that the plurality of physically regenerated polyester chips and the plurality of chemically regenerated polyester chips are all obtained by recycling the recycled polyester material and pelletizing the recycled polyester material. In particular, the recycled polyester material is r-PET flakes.

In an embodiment of the disclosure, the white polyester film has the following characteristics. Based on a total weight of 100 mol % of the white polyester film, the content of isophthalic acid in the white polyester film is between 0.1 mol % and 6 mol %. Based on a total weight of 100 wt % of the white polyester film, the content of biomass-derived ethylene glycol in the white polyester film is not more than 5 wt %. The shading value of the white polyester film is greater than or equal to 1.2. The light transmittance of the white polyester film is not more than 10%, and preferably, the light transmittance of the white polyester film is not more than 5%. The surface roughness (Ra) of the white polyester film is 10 nm to 200 nm. The reflectance of the white polyester film is 80% to 98%. The color difference value (ΔE) of the white polyester film is less than or equal to 10. Preferably, the color difference value (ΔE) of the white polyester film is less than or equal to 2. The dynamic friction coefficient of the white polyester film is 0.2 to 0.4.

Advantages of the Embodiments

One of the beneficial effects of the disclosure is that in the white polyester film and the method for manufacturing the same provided by the disclosure, via the technical solution of "mixing white regenerated polyester chips, the physically regenerated polyester chips, and the chemically regenerated polyester chips according to a predetermined intrinsic viscosity to form a polyester masterbatch material", the polyester masterbatch material may be adjusted to have a predetermined intrinsic viscosity, so as to be suitable for a film extrusion process, and a higher proportion of the recycled polyester masterbatch material is achieved.

The content disclosed above is only the preferred and feasible embodiments of the disclosure, and does not limit the scope of the claims of the disclosure. Therefore, all equivalent technical changes made by using the specification of the disclosure and the content of the figures are all included in the scope of the claims of the disclosure.

What is claimed is:

1. A method for manufacturing a white polyester film, comprising:

providing a recycled polyester material;

physically regenerating a part of the recycled polyester material to form physically regenerated polyester chips, wherein the physically regenerated polyester chips have a first intrinsic viscosity;

chemically regenerating another part of the recycled polyester material to form chemically regenerated polyester chips, wherein the chemically regenerated polyester chips have a second intrinsic viscosity less than the first intrinsic viscosity;

providing white regenerated polyester chips and mixing the white regenerated polyester chips, the physically regenerated polyester chips, and the chemically regenerated polyester chips according to a predetermined intrinsic viscosity so as to form a polyester masterbatch material; and melting and extruding the polyester masterbatch material to obtain the white polyester film having the predetermined intrinsic viscosity, wherein the predetermined intrinsic viscosity of the white polyester film is 0.36 dL/g to 0.65 dL/g, an acid value of the white polyester film is 10 mgKOH/g to 80 mgKOH/g, a surface roughness (Ra) of the white polyester film is 1 nm to 500 nm, a dynamic friction coefficient of the white polyester film is 0.2 to 0.4, an amount of the physically regenerated polyester chips is higher than an amount of the chemically regenerated polyester chips, and the second intrinsic viscosity of the chemically regenerated polyester chips is not more than 0.65 dL/g.

2. A white polyester film formed by mixing, melting, and extruding a physical regenerated polyester resin and a chemical regenerated polyester resin according to a predetermined intrinsic viscosity, wherein the white polyester film has the predetermined intrinsic viscosity, wherein the predetermined intrinsic viscosity of the white polyester film is 0.36 dL/g to 0.65 dL/g, an acid value of the white polyester film is 10 mgKOH/g to 80 mgKOH/g, a surface roughness (Ra) of the white polyester film is 1 nm to 500 nm, a dynamic friction coefficient of the white polyester film is 0.2 to 0.4, an amount of the physically regenerated polyester chips is higher than an amount of the chemically regenerated polyester chips, and the second intrinsic viscosity of the chemically regenerated polyester chips is not more than 0.65 dL/g.

3. The white polyester film of claim 2, wherein based on a total weight of 100 mol % of the white polyester film, a content of isophthalic acid in the white polyester film is between 0.1 mol % and 6 mol %; a storage modulus of the white polyester film at 150° C. and 10 Hz is $3.5 \times 10^9$ $dyne/cm^2$ to $6.0 \times 10^9$ $dyne/cm^2$.

4. The white polyester film of claim 2, wherein a haze of the white polyester film is greater than 80%, a light transmittance of the white polyester film is less than 10%, a reflectance of the white polyester film is 80% to 98%, and a shading value of the white polyester film is greater than or equal to 1.2.

5. The white polyester film of claim 2, wherein based on a total weight of 100 wt % of the white polyester film, a content of biomass-derived ethylene glycol in the white polyester film is not more than 5 wt %.

* * * * *